(12) United States Patent
Kato

(10) Patent No.: US 7,219,931 B2
(45) Date of Patent: May 22, 2007

(54) CLAMP FOR ELONGATED OBJECTS SUCH AS PIPE

(75) Inventor: Hiroyuki Kato, Ninomiya-machi (JP)

(73) Assignee: Newfrey LLC, Newark, DE (US)

( * ) Notice: Subject to any disclaimer, the term of this patent is extended or adjusted under 35 U.S.C. 154(b) by 180 days.

(21) Appl. No.: 11/011,093

(22) Filed: Dec. 15, 2004

(65) Prior Publication Data

US 2005/0139732 A1    Jun. 30, 2005

(30) Foreign Application Priority Data

Dec. 25, 2003   (JP) .............................. 2003-428681

(51) Int. Cl.
 *F16L 3/08*   (2006.01)
(52) U.S. Cl. ........................... 285/61; 248/74.2; 248/60
(58) Field of Classification Search ................ 285/61, 285/24; 248/74.2, 60, 71, 73
See application file for complete search history.

(56) References Cited

U.S. PATENT DOCUMENTS

| | | | |
|---|---|---|---|
| 3,270,998 A | | 9/1966 | Keetch ........................ 248/358 |
| 5,190,251 A | * | 3/1993 | Bodo ........................... 248/73 |
| 5,458,303 A | | 10/1995 | Ruckwardt ................. 248/74.2 |
| 5,588,683 A | * | 12/1996 | Schliessner .................... 285/62 |
| 5,797,675 A | | 8/1998 | Tanner, Jr. ................... 362/396 |
| 5,947,426 A | * | 9/1999 | Kraus ......................... 248/74.2 |
| 6,241,198 B1 | * | 6/2001 | Maruyama .................... 248/49 |
| 6,585,196 B2 | * | 7/2003 | Nakanishi ................... 248/68.1 |
| 6,915,990 B2 | * | 7/2005 | Maruyama ................. 248/68.1 |
| 7,036,775 B2 | * | 5/2006 | Nakanishi ................... 248/68.1 |
| 2002/0066835 A1 | | 6/2002 | Sentpali et al. ............. 248/68.1 |

FOREIGN PATENT DOCUMENTS

| | | |
|---|---|---|
| GB | 785300 | 10/1957 |
| GB | 2 166 794 | 5/1986 |
| JP | 55-72936 | 6/1980 |
| JP | 7-310866 | 11/1995 |
| JP | 9-126357 | 5/1997 |
| JP | 9-317946 | 12/1997 |
| WO | WO 2004/074707 | 9/2004 |

* cited by examiner

*Primary Examiner*—David Bochna
(74) *Attorney, Agent, or Firm*—Miles & Stockbridge P.C.

(57) ABSTRACT

An elongated object clamp 1 which reduces transmission of vibration between an object 2 and a support 3 in a circumferential direction of the object and an axial direction comprises a gripper unit 5 for holding an elongated object such as a pipe, a securing unit for attaching the clamp to a support such as a body panel, and a vibration absorbing unit 7 for reducing transmission of vibration between the gripper unit and the securing unit. The vibration absorbing unit can bend in various directions and includes first curved arms and second curved arms stacked between the gripper unit and the securing unit, and arranged so that bending directions of the arms cross one another.

12 Claims, 4 Drawing Sheets

CLAMP FOR ELONGATED OBJECTS SUCH AS PIPE

CROSS-REFERENCE TO RELATED APPLICATION

This application claims the benefit of Japanese Patent Application No. 2003-428681 filed Dec. 25, 2003, incorporated herein by reference.

BACKGROUND OF THE INVENTION

This invention relates to a clamp for elongated objects, which comprises a gripper unit for holding elongated objects such as pipe or wire harnesses, and a securing unit for attachment to a support such as a body panel, configured such that the elongated object is held in the gripper unit, the securing unit is attached to the support, and, thereby, the elongated object is attached to the support.

Clamps for elongated objects are known which comprise a gripper unit for holding elongated objects such as pipe or wire harnesses and a securing unit for attachment to a support such as a body panel. The elongated object is held in the gripper unit, and the securing unit is attached to the support, whereby the elongated object is attached to the support. When an elongated object such as a pipe is held on a support such as a body panel, it is desirable that the transmission of vibration from the pipe to the body panel be prevented, or, alternatively, that the transmission of vibration opposite thereto be prevented. The vibration prevention means most frequently used is elastic soft material such as rubber, which is attached to the bottom surface or the like of the gripper unit receiving the pipe or the like for reducing the transmission of vibration.

U.S. Pat. No. 5,588,683 issued Dec. 31, 1996 discloses a clamp for pipe which does not use an elastic soft material layer. This clamp uses a vibration absorbing unit arranged between a gripper unit and a securing unit for reducing the transmission of vibration between the gripper unit and the securing unit. In this clamp, the vibration absorbing unit comprises a flexible bridge including a pair of curved arms.

Japanese Laid-Open Patent Application No. H9-126357/1997 (gazette publication) also discloses an elongated-object clamp which does not use an elastic soft material layer. In this clamp, multiple bendable curved holding pieces of a gripper unit are erected from a bottom surface portion which supports an elongated object such as a pipe, to reduce the transmission of vibration between the elongated object and the gripper unit. Three spiraling coupling plates are arranged between a base for supporting the gripper unit and a securing unit for attachment to a stud on a panel, thereby reducing the transmission of vibration between the securing unit and the gripper unit.

When an elastic soft material layer is used as the vibration absorbing mechanism, in order to secure the elastic soft material layer to the gripper unit the number of manufacturing dies increases as compared to when no elastic soft material layer is used; the cost of the finished product increases, and the number of assembly steps increases. The clamps for pipe and the like in the above-described prior art are provided with a different mechanism for absorbing the transmission of vibration between an elongated object such as pipe and a support such as a body panel.

With the vibration absorbing mechanism in the above-mentioned U.S. Patent, the curved arms between the gripper unit and the securing unit contribute to the absorption of vibration in the circumferential direction relative to the pipe, but are not suitable for absorbing vibration in directions other than the circumferential direction relative to the pipe (e.g., pipe axial direction). If the curved arms are damaged, there is a danger of the pipe falling away from the support.

With the vibration absorbing mechanism in the above-mentioned Japanese application, the bendable curved holding pieces are complexly erected from the bottom surface of the gripper unit; the manufacturing dies become complex; and finished product costs are increased. Also, the three spiraling coupling plates provided in the vibration absorbing mechanism between the securing unit attached to a stud on a panel and the base supporting the gripper unit, further complicate the dies, and finished product costs are increased. Furthermore, when those vibration absorbing mechanisms are damaged, there is a danger of the pipe falling away from the clamp.

BRIEF DESCRIPTION OF THE INVENTION

Accordingly, an object of the present invention is to provide a clamp for elongated objects such as pipe, in which the vibration absorbing mechanism for reducing the transmission of vibration between an elongated object and a support can be realized in a simple shape, and can reduce the transmission not only of vibration in the circumferential direction relative to the elongated object, but also of vibration having a component in the axial direction of the elongated object.

In a preferred, but non-limiting embodiment of the present invention, a clamp for an elongated object comprises a gripper unit for holding an elongated object such as a pipe or wire harness, and a securing unit for attachment to a support such as a body panel. The clamp is configured such that the elongated object is attached to the support by the elongated object being held by the gripper unit, and by the securing unit being attached to the support. A vibration absorbing unit is provided between the gripper unit and the securing unit, for reducing the transmission of vibration between the gripper unit and the securing unit. The vibration absorbing unit can bend in directions in which the gripper unit and the securing unit move relative to one another. The vibration absorbing unit includes a pair of first flexible curved arms and pairs of second flexible curved arms, the first curved arms and the second curved arms being superposed between the gripper unit and the securing unit, and being arranged so that bending directions thereof cross.

In this embodiment, no elastic soft material layer is required. The vibration absorbing mechanism of the invention can be realized in a simple shape; die costs can be held down to a low level; and the transmission not only of vibration in the circumferential direction relative to the elongated object such as pipe, but also of vibration having a component in the axial direction of the elongated object can be reduced.

In the elongated-object clamp described above, it is preferable that the gripper unit comprise a curved receptacle for accepting at least half of the circumference of a side surface of the elongated object, and an elastic holding piece for pressing, from above, a side surface of the elongated object in the curved receptacle, and that the securing unit comprise a shaft which extends below the gripper unit, shaped for attachment to the support. It is further preferable that the first curved arms and the second curved arms be arranged so that they cross at an angle of 90 degrees, so that the directions of bending are perpendicular to one another, so that one of the sets of curved arms can reduce the transmission of vibration in the circumferential direction relative to the elongated object, and the other set of curved arms can reduce the transmission of vibration having a component in the axial direction of the elongated object, whereby vibration in all directions can be absorbed.

In the elongated-object clamp described above, furthermore, it is preferable that the first curved arms be arranged on the underside of the gripper unit and that the second curved arms be arranged on the upper side of the securing unit, and that a regulating member be formed between the securing unit and the gripper unit, extending between the pairs of second curved arms to a position adjacent to the underside of the gripper unit, for regulating the amount of movement of the arms so that the range of movement of the elongated object can be regulated. The regulating member is preferably a T-shaped member having a rod-shaped part which extends upward from the upper part of the securing unit and a horizontal part positioned adjacent to the underside of the gripper unit and extending to both sides in the width direction of the gripper unit.

In the elongated-object clamp described above, moreover, it is preferable that the horizontal part of the T-shaped regulating member be accommodated inside a frame part which extends below the gripper unit so as to prevent the gripper unit from becoming detached from the securing unit even if the first curved arms or second curved arms are damaged due to an impact or the like. Thus, the elongated object can be prevented from falling away from the support.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 1:
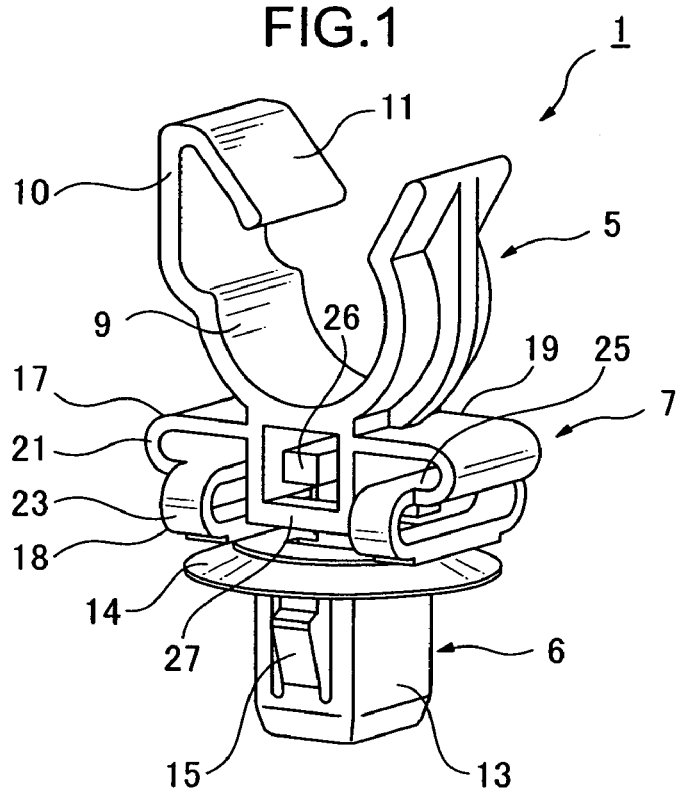
FIG. 1 is a perspective view of an elongated-object clamp relating to one embodiment of the present invention.
Figure 2:
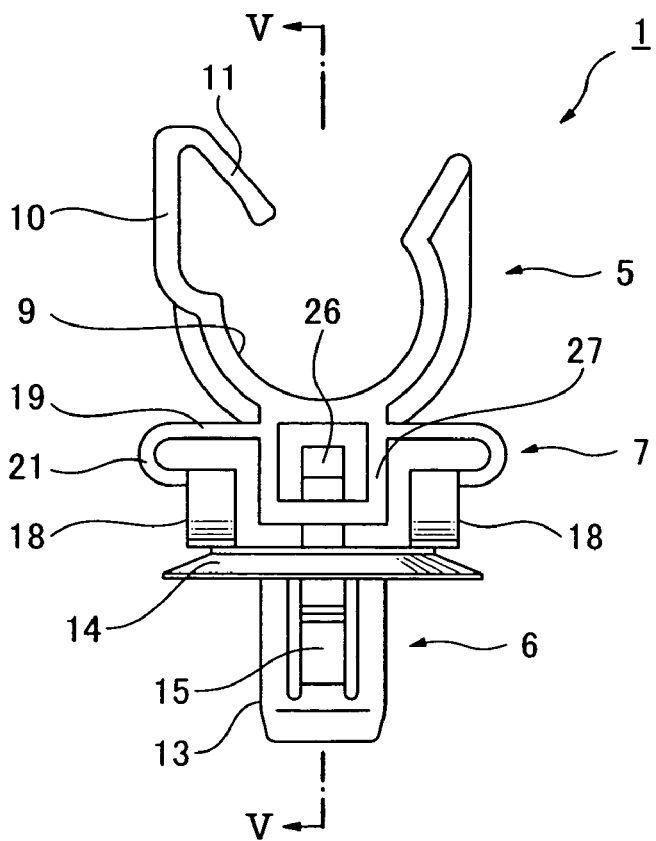
FIG. 2 is a front elevation view of the elongated-object clamp in FIG. 1.
Figure 3:
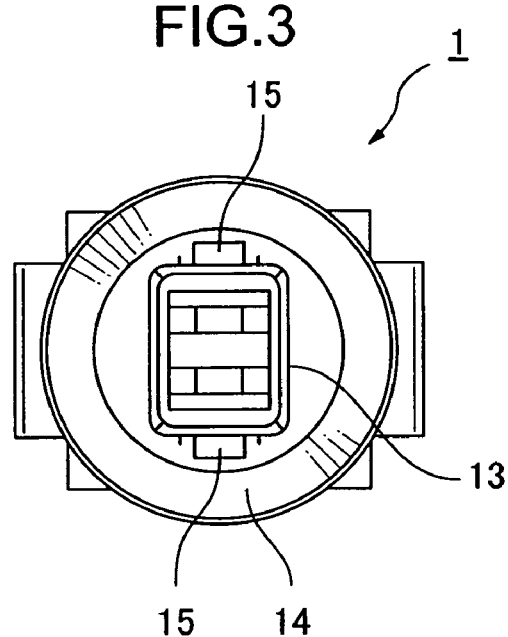
FIG. 3 is a bottom view of the elongated-object clamp shown in FIG. 1.
Figure 4:
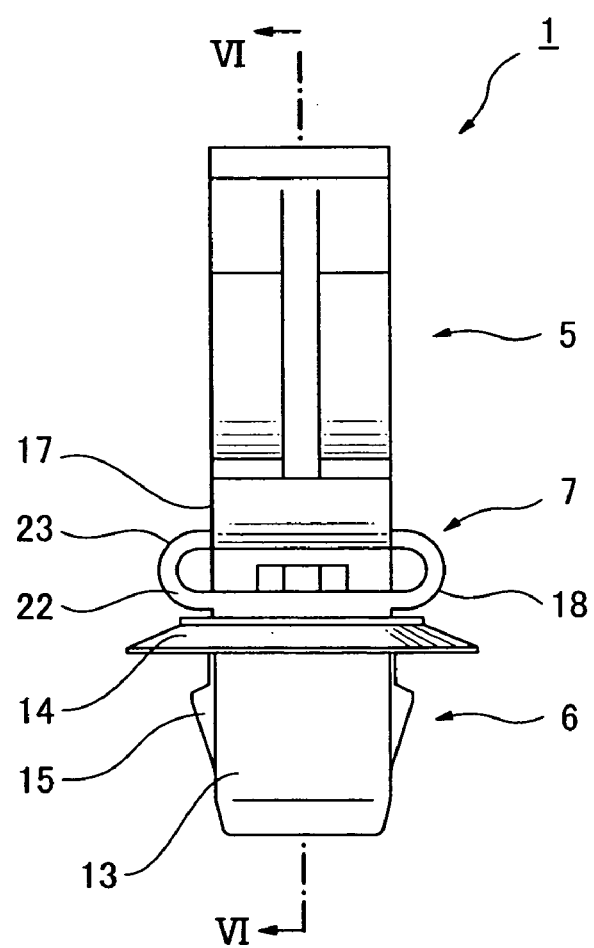
FIG. 4 is a right side elevation view of the elongated-object clamp shown in FIG. 2.
Figure 5:
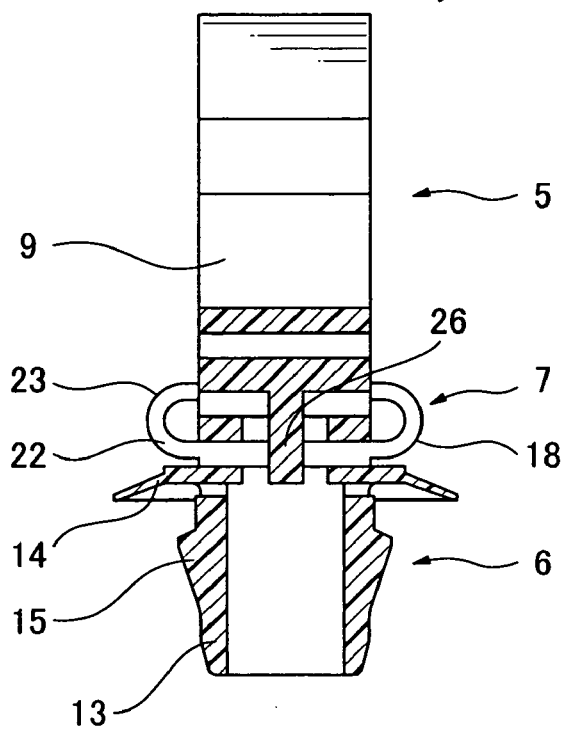
FIG. 5 is a section at line V—V of the elongated-object clamp shown in FIG. 2.
Figure 6:
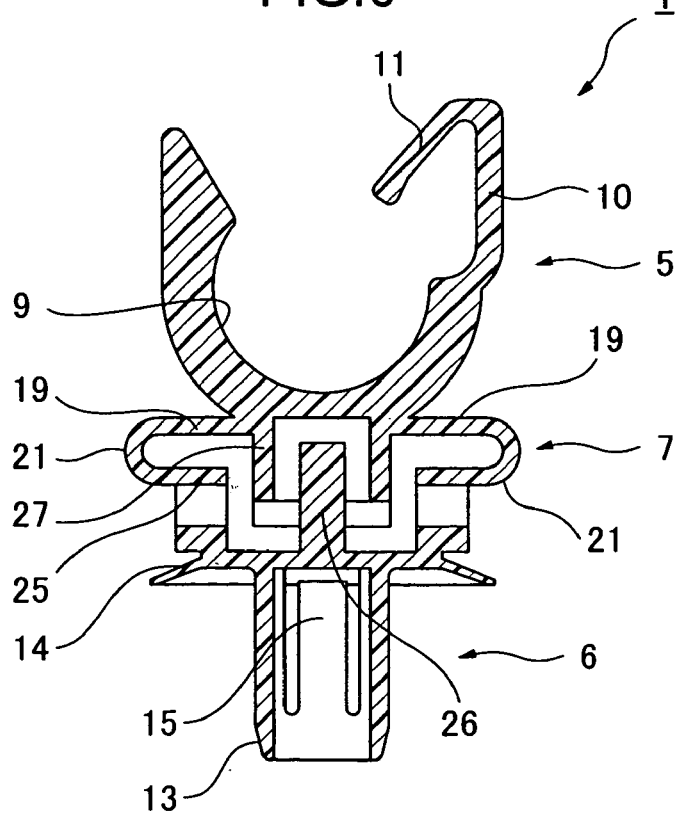
FIG. 6 is a section at line VI—VI of the elongated-object clamp shown in FIG. 4.

In a preferred embodiment shown in FIGS. 1 to 6, an elongated-object clamp 1 is integrally molded of a hard synthetic resin. The elongated-object clamp 1 does not employ an elastic soft material layer for reducing the transmission of vibration between a pipe 2 and a body panel 3 (see FIGS. 7 and 8). The elongated-object clamp 1 comprises a gripper unit 5 (or several gripper units) for holding an elongated object such as the pipe 2 or a wire harness or the like, a securing unit 6 for attaching the elongated-object clamp 1 to a support such as the body panel 3, and a vibration absorbing unit 7, arranged between the gripper unit 5 and the securing unit 6, for reducing the transmission of vibration between the gripper unit 5 and the securing unit 6.

The gripper unit 5 comprises at least one flexible curved receptacle 9 for accepting at least half of the circumference of a side surface of the pipe 2, and an elastic holding piece 11 for pressing, from above, a side surface of the pipe 2 held in the curved receptacle. The elastic holding piece 11 is bent back into the curved receptacle 9 from one upward extension 10 of the curved receptacle 9. The gripper unit 5 can be made in other shapes or structures, so long as it can hold an elongated object such as a pipe.

The securing unit 6 comprises a shaft 13, which extends below the gripper unit 5 and the vibration absorbing unit 7, and a circular flange 14 at an upper end of the shaft. The shaft 13 has a shape suitable for insertion into an attachment hole in the body panel 3. The shaft 13 is preferably formed in the shape of a square tube matching a square attachment hole in the body panel, so that the pipe 2 held in the gripper unit 5 can be prevented from turning about the axis of the shaft 13. On two opposing side surfaces of the shaft 13, elastic pawls 15 are formed for securing the securing unit 6 in the attachment hole of the body panel 3 (see FIG. 8). The flange 14 is preferably a large circular shape for stabilizing the securing to the body panel 3, and formed in the shape of a suction plate having an edge region which slopes downward. The flange 14 formed in this suction plate shape is preferred because, when the flange 14 is pressed against a contact surface near the attachment hole in the body panel 3, the edge thereof makes tight contact with the panel surface due to a reaction force, and the securing force is enhanced by that reaction force. The securing unit 6 may have a structure that engages a stud when a stud is erected on the body panel, or may have another appropriate shape or structure for attachment to a support such as a body panel.

The vibration absorbing unit 7 comprises a pair of first flexible curved arms 17 which can bend up and down when the gripper unit 5 and the securing unit 6 mutually move farther apart or come closer together, and two pairs of second flexible curved arms 18 that can bend up and down in a manner like the first curved arms 17. The first flexible curved arms 17 have a coupling part thereof formed integrally with the bottom of the curved receptacle 9, and are thus coupled rigidly to the gripper unit 5. The arms 17 include two wide plate-shaped horizontal extensions 19 extending out from the coupling part horizontally at both sides thereof. At the ends of the horizontal extensions 19 are formed curved portions 21 which curve downward.

Figure 7:
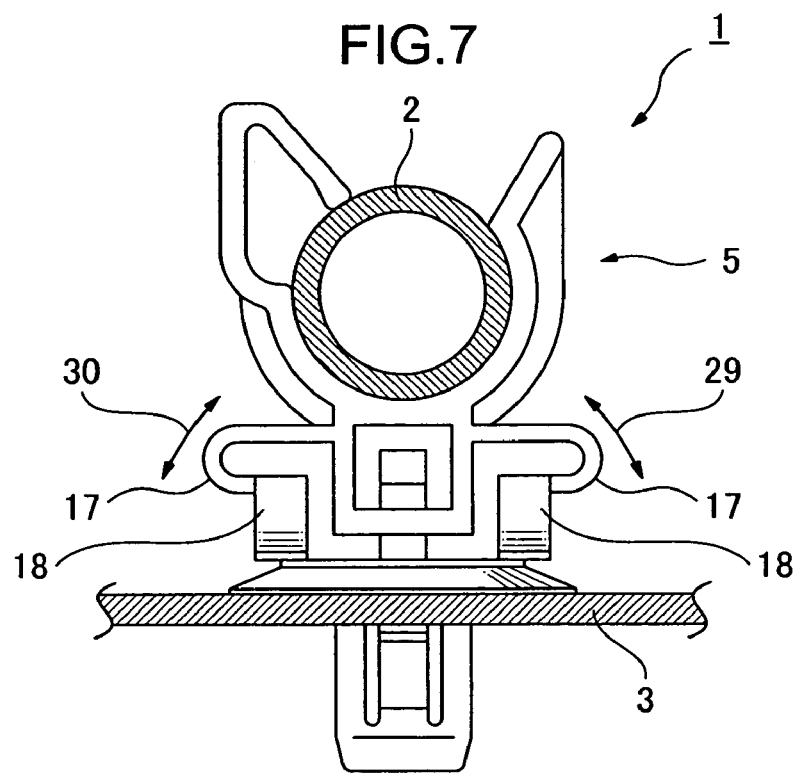
FIG. 7 is a front elevation view of the elongated-object clamp shown in FIG. 1, showing how pipe is attached to a body panel.

The lower end of each of the two curved portions 21 of each of the first curved arms 17 is molded integrally with and coupled rigidly to a pair of second curved arms 18. Each pair of second curved arms 18 has a lower coupling part formed integrally with the flange 14 of the securing unit 6 and coupled rigidly to the securing unit 6. Thus, the first curved arms 17 and the securing unit 6 are coupled integrally by the second curved arms 18. The lower coupling parts of the second curved arms 18 have extensions 22 that extend out horizontally at both sides, at right angles to the direction of the extensions 19 of the curved arms 17 (that is, parallel with the axial direction of a pipe 2 held in the gripper unit 5). At the ends of the extensions 22, curved portions 23 curve upward, and the upper parts of the two curved portions 23 form coupling portions 25 with the first curved arms 17. The first curved arms 17, as shown in FIG. 7, can bend in the up and down direction and the horizontal direction perpendicular to the axial direction of the pipe 2. The second curved arms 18, as shown in FIG. 8, can bend in the up and down direction and the horizontal direction along the axial direction of the pipe 2.

The first curved arms 17 and the second curved arms 18 are not limited to arms which cross at right angles, but may be arranged so as to cross at other angles so long as both vibration components in the circumferential direction and vibration components in the axial direction of the elongated object held in the gripper unit 5 are absorbed. As shown in the drawings, the elongated-object clamp 1 does not have a complex shape, as in the above-mentioned Japanese application, can be made by dies of simple structure, and can be made with reduced manufacturing cost.

In the elongated-object clamp 1, a regulating member 26 extends from the flange 14 between the pairs of second curved arms 18 to a position adjacent to the bottom of the curved receptacle 9 of the gripper unit 5. The regulating member 26 extends from the flange 14 in a rod-shape that is the stem of a T-shaped member having a horizontal part which extends to both sides in the width direction of the curved receptacle 9. At the bottom of the curved receptacle 9, a frame part 27 is formed which encloses the horizontal part of the T-shaped regulating member 26. The regulating member 26 is configured so that movement of the gripper unit 5 relative to the securing unit 6 is limited by the horizontal part of the regulating member striking the bottom of the receptacle 9 or the frame part 27. Furthermore, even if an abnormally strong force is applied due to a vehicle collision or the like, and the first curved arms 17 or the second curved arms 18 are damaged, the regulating member 26 will still be accommodated inside the frame part 27, so that the gripper unit 5 will be prevented from separating from the securing unit 6. Accordingly, a pipe 2 held in the gripper unit 5 can be prevented from falling away from a body panel 3.

Figure 8:
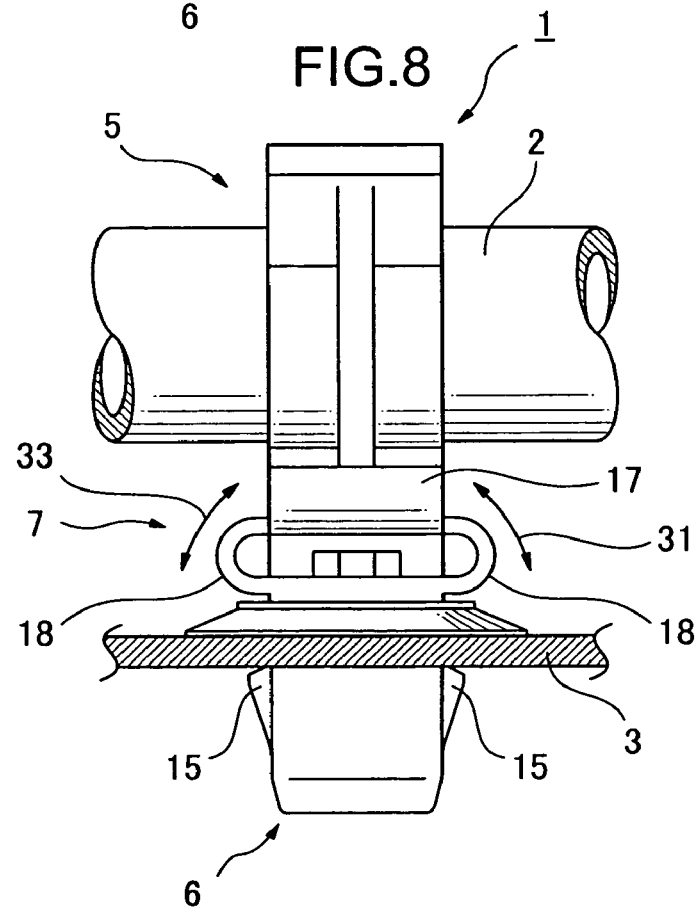
FIG. 8 is a right side elevation view of the elongated-object clamp shown in FIG. 7.

FIG. 7 and FIG. 8 show the condition wherein a pipe 2 that is an elongated object is attached to a body panel 3 that is a support, using the elongated-object clamp 1. In FIG. 7, the first curved arms 17 can bend, as indicated by the arrows 29 and 30, so as to match vibration along the circumferential direction of the pipe 2, reducing the transmission of vibration in the circumferential direction of the pipe 2. In FIG. 8, the second curved arms 18 can bend, as indicated by the arrows 31 and 33, so as to match vibration along the axial direction of the pipe 2, reducing the transmission of vibration in the axial direction of the pipe 2. In this way, vibration in all directions can be absorbed by the first curved arms 17 and the second curved arms 18.

As used herein, terms such as "above . . . below . . . up . . . down . . . horizontally" are not intended to limit the invention, but are used for ease of description of the relationship of various parts of the invention, it being apparent that various orientations of a clamp of the invention are possible depending upon the environments in which the invention is employed.

While a preferred embodiment of the invention has been shown and described, it will be apparent that changes can be made without departing from the principles and spirit of the invention, the scope of which is defined in the accompanying claims.

What is claimed is:

1. A clamp for an elongated object comprises a gripper unit for holding the object and a securing unit for attaching the gripper unit to a support, wherein:
a vibration absorbing unit is provided between the gripper unit and the securing unit for reducing the transmission of vibration between the gripper unit and the securing unit, and includes first flexible curved arms and second flexible curved arms superposed upon one another between the gripper unit and the securing unit and arranged so that bending directions of the first and second flexible curved arms cross one another.

2. The elongated-object clamp described in claim 1, wherein the first curved arms and the second curved arms cross at an angle of 90 degrees, so that the directions of bending are perpendicular to one another.

3. The elongated-object clamp described in claim 1, wherein the first curved arms are arranged on an underside of the gripper unit and the second curved arms are arranged on an upper side of the securing unit, and a regulating member is formed between the gripper unit and the securing unit, extending to a position adjacent to an underside of the gripper unit, for limiting the amount of movement of the first and second curved arms to within a certain range.

4. The elongated-object clamp described in claim 3, wherein the regulating member is a T-shaped member having a stem which extends upward from the securing unit and a horizontal part positioned adjacent to the underside of the gripper unit and extending to both sides in a width direction of the gripper unit.

5. The elongated-object clamp described in claim 4, wherein the horizontal part of the T-shaped regulating member is accommodated inside a frame part below the gripper unit so as to prevent the gripper unit from becoming detached from the securing unit even if the first curved arms or the second curved arms are damaged.

6. The elongated-object clamp described in claim 1, wherein there are a pair of the first flexible curved arms and two pairs of the second flexible curved arms, the first curved arms extend oppositely along a first direction, and the second curved arms of each pair thereof extend oppositely along a second direction, each pair of second curved arms is disposed adjacent to a corresponding end of a first curved arm and is connected thereto, and the gripper unit is connected to the securing unit via the first curved arms and the second curved arms.

7. A clamp for an elongated object comprises a gripper unit for holding the object and a securing unit for attaching the gripper unit to a support, wherein:
the gripper unit comprises a receptacle for the elongated object and an elastic holding piece for pressing the held object from above, and the securing unit comprises a shaft which extends below the gripper unit for attachment to the support, wherein:
a vibration absorbing unit is provided between the gripper unit and the securing unit for reducing the transmission of vibration between the gripper unit and the securing unit and includes first flexible curved arms and second flexile curved arms superposed upon one another between the gripper unit and the securing unit and arranged so that bending directions of the first and second curved arms cross one another.

8. A clamp for an elongated object comprises a gripper unit for holding the object and a securing unit for attaching the gripper unit to a support, the units being arranged sequentially along an axis, wherein:
a vibration absorbing unit is provided along the axis, between the gripper unit and the securing unit for reducing the transmission of vibration between the gripper unit and the securing unit, and includes a mechanism constructed to bend in directions that cross one another in respective orthogonal axial planes,
wherein the mechanism includes first and second flexible arms constructed to bend in directions that cross one another.

9. The elongated-object clamp described in claim 8, wherein the first arms extend oppositely along a first direction and the second arms extend oppositely along a second direction crossing the first direction.

10. The elongated-object clamp described in claim 9, wherein the first arms and the second arms are superposed upon one another between the gripper unit and the securing unit.

11. The elongated-object clamp described in claim 10, further comprising a regulating member that limits bending movement of the arms to within a certain range.

12. The elongated-object clamp described in claim 10, wherein there are a pair of the first arms and two pairs of the second arms, the pairs of second arms are spaced from one another and each pair of second arms is adjacent to an end of a corresponding first arm and connected thereto, and the gripper unit is connected to the securing unit via the first arms and the pairs of second arms.

* * * * *